MATRIX CONTROL CIRCUIT

Filed Dec. 20, 1963 2 Sheets-Sheet 1

INVENTORS
PAUL ABRAMSON
PAO H. CHIN
GEORGE R. STILWELL, JR.

BY [signature]
AGENT

Aug. 13, 1968 P. ABRAMSON ET AL 3,397,388

MATRIX CONTROL CIRCUIT

Filed Dec. 20, 1963 2 Sheets-Sheet 2

United States Patent Office 3,397,388
Patented Aug. 13, 1968

3,397,388

MATRIX CONTROL CIRCUIT

Paul Abramson, Yorktown Heights, Pao H. Chin, Pleasantville, and George R. Stilwell, Jr., West Nyack, N.Y., assignors to International Business Machines Corporation, New York, N.Y., a corporation of New York Filed Dec. 20, 1963, Ser. No. 332,058
13 Claims. (Cl. 340—166)

ABSTRACT OF THE DISCLOSURE

A circuit for energizing one or more thyratron-like elements arranged in a matrix comprising a first switching means normally maintaining a sustaining potential across the thyratron-like elements and operable to remove the sustaining potential from a first group of said thyratron-like elements, a second set of switching means normally latching the control element of said thyratron-like elements at a voltage insufficient to energize said thyratron-like elements and capable of selectively removing said latching potential from said first group of the thyratron-like elements, and a third set of switching means normally applying a potential to said control element of said thyratron-like elements similar to the potential applied through said second set of switching means and said third set of switching means capable of removing said potential from a second group of said thyratron-like elements so that said first group and said second group of the thyratron-like elements have only one common thyratron-like element.

This invention relates to circuitry for energizing any desired combination of elements in a matrix of thyratron-like elements. More particularly this invention relates to a circuit for energizing thyratron-like display elements or thyratron-like elements connected in series with display elements where the display elements are connected in a plurality of matrix arrays, each of which may be selectively energized to represent any desired alpha-numeric character.

The self storing capability of thyratron-like devices makes them extremely useful for various decoding and control applications. One application in which these devices are quite often used is to control the illuminating devices in alpha-numeric matrix display boards of the type used in stock exchanges, railway and airline terminals, and computer output devices. In these applications, the thyratron device may either be connected in series with the illuminating device or a thyratron device which is capable of emitting light when energizing may be employed.

While there are some applications of these matrix display boards where the display does not change very rapidly, there are many applications where the display varies at a high rate and the nature of the input, which is often from a computer device, requires that the control circuitry for the display be capable of reacting very rapidly.

Another desirable feature is that a single control circuit be capable of controlling many remotely positioned display boards using a minimum number of wires. Existing display-board control circuits generally employ a separate control wire for each element in the display. Particularly in large display boards, this arrangement results in a complicated maze of wires leading into that display board. From the standpoint of initial cost, maintenance cost, and reliability, it is preferable that the number of wires leading into the display board be substantially reduced and that the control circuitry be made as simple as possible.

It is therefore an object of this invention to provide an improved control circuit for energizing elements in a matrix array of thyratron-like elements.

A more specific object of this invention is to provide an improved circuit for energizing thyratron-like elements being used either as the illuminating device or to control the illuminating device in a matrix display board.

Another object of this invention is to provide a circuit which is capable of rapidly varying the display on a thyratron-like-element-controlled display board.

A further object of this invention is to reduce the number of control wires required for a thyratron-controlled matrix display board.

A still further object of this invention is to provide a control circuit for controlling a plurality of remotely positioned matrix display boards.

Still another object of this invention is to provide a simple circuit for controlling the display on a matrix display board controlled by thyratron-like elements.

In accordance with these objects, this invention provides a matrix array of thyratron-like elements which array is arranged in rows and columns. The thyratron-like elements may be of the type which are capable of giving off light or may be connected in series with an illuminating element. A sustaining potential is normally maintained across each element and there is a switch for each row of elements which may be opened to remove the sustained potential from the elements in that row. The control electrodes for the elements are normally latched at a potential which is insufficient, in conjunction with the sustaining potential applied to external electrodes of the element, to cause the elements to be energized. This insufficient potential is also normally applied through a transfer contact to a line connected to the control electrode of each element in a given column. When the transfer contact is transferred, a potential is applied to the control electrodes for the elements of the column connected to the transferred switch which potential is sufficient to, in conjunction with the sustaining potential normally applied to the element, energize the elements in that column. The final step in energizing desired elements in a given row is to open a switch for that row which removes the latching potential from the control electrodes of all the elements in that row.

The foregoing and other objects, features and advantages of the invention will be apparent from the following more particular description of preferred embodiments of the invention, as illustrated in the accompanying drawings.

*General description*

Figure 1:
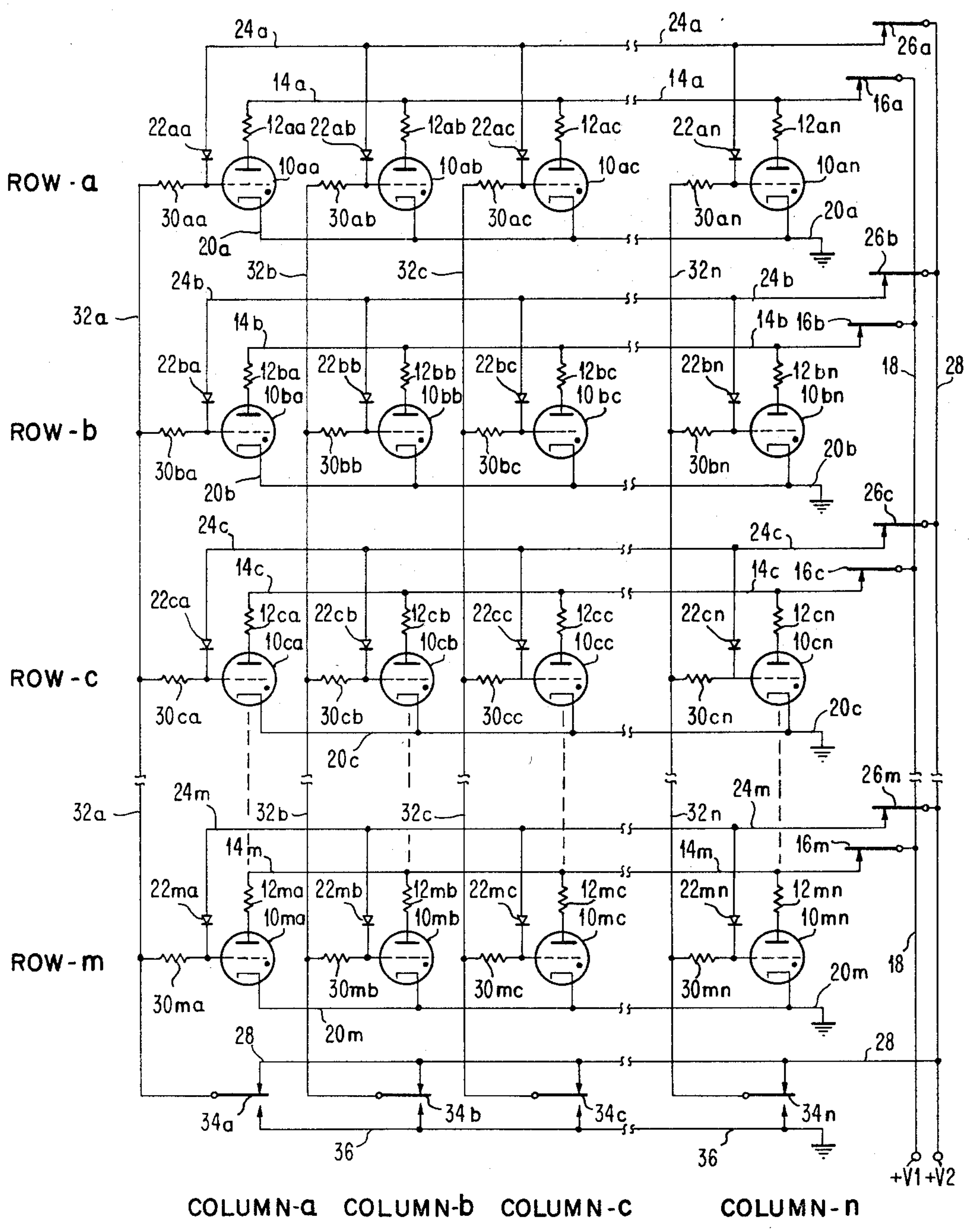
FIG. 1 is a schematic diagram of a preferred embodiment of the invention.

Referring to FIG. 1, it is seen that the circuit includes a plurality of three-element neon tubes 10. The three-element neon tubes, when energized, give off visible light. Neon tubes 10 are arranged in a matrix of $m$ rows and $n$ columns. Each individual neon tube 10 is identified by two letters, the first letter representing its row and the second letter, its column. Therefore, a neon tube 10 in row $b$, column $c$ is designated by the character 10*bc*. It should be noted that a three-element neon tube may be energized in one of three ways: (1) by the potential difference between its plate and its cathode exceeding a first given value; (2) by the potential difference between its plate and its grid exceeding a second given value; and (3) by the potential difference between its grid and its cathode exceeding a third given value. The second way is the way employed in the circuit of FIG. 1.

The anode of each neon tube is connected through a resistor 12 to a line 14. Each resistor 12 bears the letter designation for the neon tube it is associated with while each line 14 bears the row letter for its row. This manner of identifying individual components will be followed throughout the remaining description. Each line 14 is connected through a normally closed contact 16 and a common line 18 to a source of potential +V1. Potential +V1 is in excess of the potential required to sustain conduction in a neon tube 10 but is not sufficiently different from the potential applied to the cathode of a tube 10 to cause the tube to be energized. The cathode of each neon tube 10 is connected to ground potential through a common line 20.

The control grid of each neon tube is connected through a diode 22, a line 24, a normally closed contact 26, and a common line 28 to a source of positive potential +V2 where V2 is less than V1. The potential +V2 is such that the potential between the control grid and the cathode of a tube 10, V2, and the potential between the plate and the control grid (V1—V2) are both insufficient to energize a neon tube. The control grid of each neon tube is also connected through a resistor 30, a line 32 which is common to all the tubes in a given column, the normally-closed point of a transfer contact 34, and line 28 to source of potential +V2. The normally-open point of transfer contact 34 is connected through line 36 to ground.

*Description of operation*

To illustrate the operation of the circuit shown in FIG. 1, assume that it is desired to energize neon tubes 10*ba* and 10*bc*, leaving all other neon tubes in row *b* extinguished and leaving the neon tubes in the other rows of the matrix in their existing condition. The first step in the operation is to open contact 16*b*, thereby removing sustaining potential +V1 from all of the neon tubes in row *b*, causing these tubes to be deenergized. Contact 16*b* is opened only momentarily and is reclosed as soon as the neon tubes have been extinguished. Since it is desired to ignite neon tubes 10*ba* and 10*bc*, contacts 34*a* and 34*c* are transferred causing ground potential to be applied to lines 32*a* and 32*c*. However, since at this time the control electrodes of the neon tubes are latched at potential +V2, the potential level applied to them through contacts 26, lines 24, and diodes 22, no tubes are energized at this time. The final step in the energizing operation is to momentarily open contact 26*b*, removing the latching potential from all the neon tubes in row *b*. The ground potential on lines 32*a* and 32*c* applied to the control grids of tubes 10*ba* and 10*bc*, is therefore effective to cause these tubes to be energized. The remaining tubes in row *b* still have potential +V2 applied to their control grids through the normally closed points of contacts 34 and therefore remain deenergized. It can be seen that the result of the above operations is to energize tubes 10*ba* and 10*bc*, to deenergize the remaining neon tubes in row *b*, and to leave the neon tubes in the other rows of the matrix in their existing condition. Thus, the desired result has been accomplished.

Figure 2:
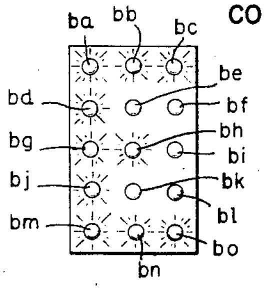
FIG. 2 is a diagram illustrating how the illuminating elements may be arranged to form a single matrix display.

To obtain a matrix display board, assume that the neon tubes in each row of the matrix shown in FIG. 1 are in fact, arranged in a matrix array such as that shown in FIG. 2. This results in a matrix display board which is capable of displaying *m* characters. Referring to FIG. 2, and assuming that the elements shown are those of row *b* in FIG. 1, it is seen that with a fifteen-element matrix display wherein the elements are arranged in a 3 x 5 matrix, the character E is obtained by energizing neon tubes *ba, bb, bc, bd, bg, bh, bj, bm, bn* and *bo*. (It should be noted that in FIG. 1 10*bn* is used to designate the last of an indefinite number of tubes in row *b* of the matrix, whereas in FIG. 2, the character *bn* is used to designate a specific tube, the fourteenth tube in this row.)

*Alternative embodiments*

Figure 3:
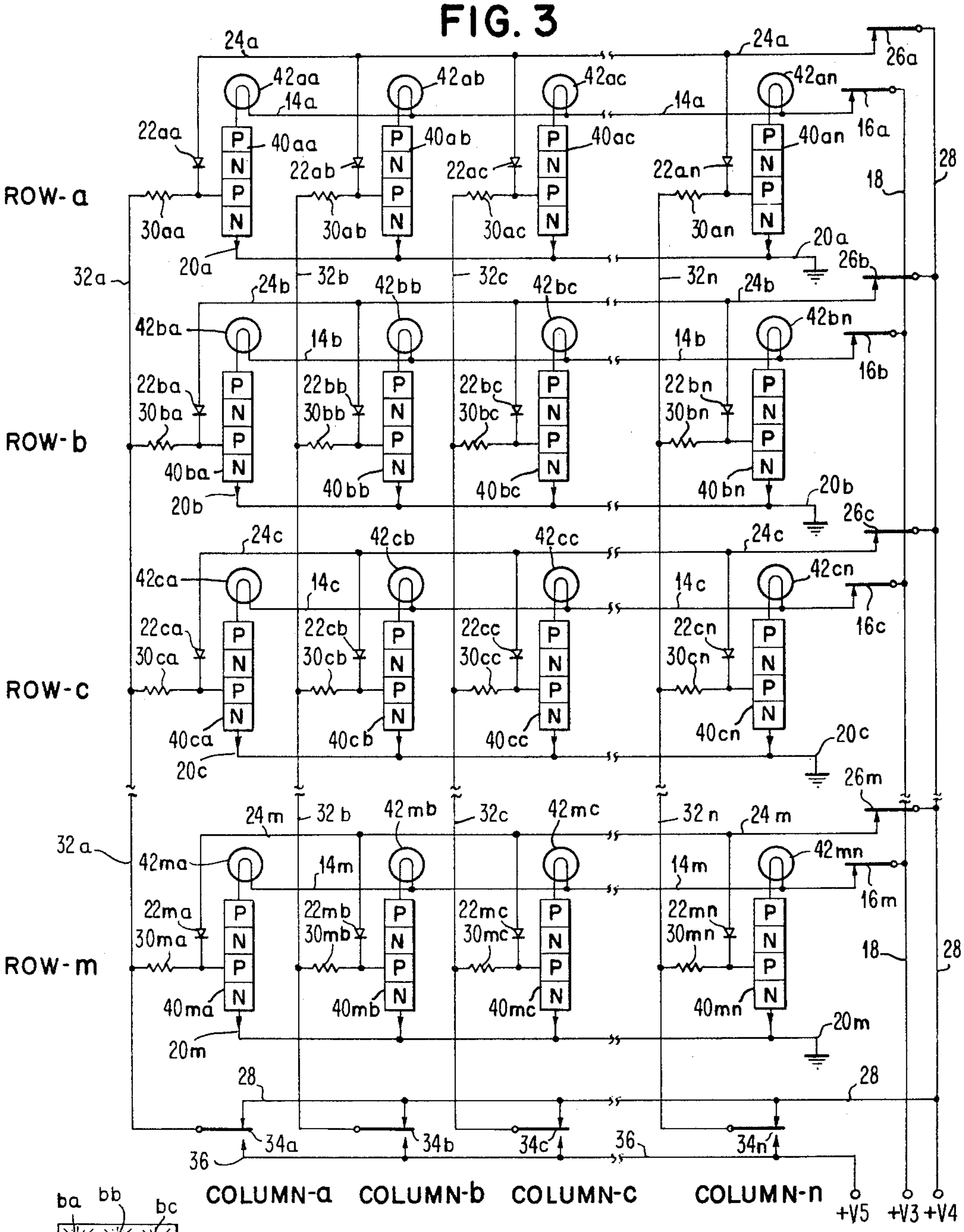
FIG. 3 is a schematic diagram of an alternative embodiment of the invention.

As was indicated previously, the thyratron-like element used may not always be of a type which is capable of giving off visible light. FIG. 3 shows an embodiment of the invention wherein the thyratron-like element employed is a PNPN thyratron transistor of a standard variety. Such a transistor becomes energized when the potential applied to its internal P electrode, its control electrode becomes more positive than the potential applied to its external N electrode, its cathode, and remains energized until the potential at its external P electrode, its anode, drops below a predetermined threshold. In FIG. 3, each thyratron transistor 40 is connected in series with an incandescent lamp 42. Except for the substitution of the thyratron transistor-incandescent lamp combination 40–42 for the neon tube-resistor combination 10–12 all the elements in FIG. 3 are identical to, and bear the same reference numerals as, those shown in FIG. 1. The only other differences in the two circuits is that a potential V3 has been substituted for the potential V1 and a potential V4 for the potential V2, these potential changes being necessitated by the different firing characteristics of the elements employed. The remaining change is that line 36 is now connected to a source of potential +V5 rather than to ground, this change likewise being necessitated by the difference in the nature of the elements employed.

The operation of the circuit shown in FIG. 5 is substantially the same as that of the circuit shown in FIG. 1 and, for this reason, will not be described.

While the thyratron-like elements shown in FIGS. 1 and 3 are neon tubes and thyratron transistors, respectively, it is to be understood that any suitable thyratron-like element may be employed in these circuits. Likewise, in the circuit of FIG. 3, any suitable light-emitting element may be substituted for the incandescent lamp 42.

While the switches 16, 26, and 34 may be manual, high speed operation would generally require that these switches be electronically controlled. They may, for example, be the contacts on relays, or electronic switches such as transistors may be substituted for them.

As a final point, it should be noted that the control switches 16, 26 and 34 may be positioned at a location which is remote from the display elements 10 shown in FIG. 1 and that, in fact, the various rows of elements may be positioned at points which are remote from each other as well as being remote from the control switches. This permits the same display to be set up simultaneously at a variety of remote locations or permits different displays to be set up at these locations. Regardless of the physical location of the various displays the circuit requires only $(2m+n)$ wires from the control circuit to control one or more display boards having a total of *mn* display elements. To illustrate the reduction in control wires which the circuits provides, it requires only 35 wires to control ten, 3 x 5 matrix displays as opposed to the 150 wires required if a separate wire is used to control each display element.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit for energizing any desired combination of elements in an array of thyratron-like elements, each element in said array being a member of one of a first plurality of groups of elements and a member of one of a second plurality of groups of elements, comprising:

means normally operative to maintain a sustaining potential across said elements and operable selectively to remove said sustaining potential from the elements of at least one group of said first plurality of groups of elements;

means normally operative to latch the control electrodes of said elements at a potential which is insufficient, in conjunction with said sustaining potential, to energize said elements and operable selectively to remove the latching potential from the control electrodes of the elements in at least one group of said first plurality of groups;

and means normally operative to apply a potential of the same type as said latching potential to the control electrodes of said elements, and operable selectively to remove last said potential from the elements of at least one of said second groups of elements and for instead applying a potential which is sufficient, in conjunction with said sustaining potential, to energize the elements of that second group.

2. A circuit for energizing any desired combination of elements in a matrix array of thyratron-like elements, said matrix array having rows and columns, comprising:

means for normally maintaining a sustaining potential across said elements, said means including means for removing said sustaining potential from any selected row of said elements;

means for normally latching the control electrodes of said elements at a potential which is insufficient, in conjunction with said sustaining potential, to energize said elements, said latching means including means for removing the latching potential from the control electrodes of the elements in any selected row of said elements;

means for normally applying a potential of the same type as said latching potential to the control electrodes of said elements;

and means, including in part said last-mentioned means, for removing last said potential from any selected column of said matrix and for instead applying to the control electrodes for the elements of that column a potential which is sufficient, in conjunction with said sustaining potential, to energize the elements of that column.

3. A circuit for energizing any desired combination of elements in a matrix array of thyratron-like elements, said matrix array having rows and columns, comprising:

means, including a first switching means for each row of the matrix, for normally maintaining a sustaining potential across each of said elements;

means, including a second switching means for each row of said matrix, for normally latching the control electrode of each of said elements at a potential which is insufficient in conjunction with said sustaining potential to energize said elements;

and means, including a transfer contact for each column of said matrix, for normally appying a potential of the same type as said latching potential to the control electrode of each of said elements;

said transfer contact being transferrable to apply to the control electrode of each element in the column with which it is associated a potential which is sufficient in conjunction with said sustaining potential, to energize the elements of that column.

4. A circuit for energizing any desired combination of elements in a matrix array of thyratron-like elements having at least one external electrode and a control electrode, said matrix array having rows and columns, comprising:

first switching means for each row in the matrix;

means for connecting said external electrode of each element in a given row through the associated first switching means to a first source of sustaining potential;

second switching means corresponding to each row in the matrix;

a unidirectional device for each element;

means for connecting the control electrode of each element through its associated unidirectional device and the corresponding second switching means to a second source of potential which is insufficient, in conjunction with said sustaining potential, to energize an element;

a switching means corresponding to each column of the matrix;

means for normally connecting the control electrode for the elements in a given column through the corresponding switching means to a source of potential which is substantially the same as said second source of potential;

and means, including in part said last-mentioned means, operable when one of said column switching means is transferred for connecting the control electrodes for the elements in that column to a source of potential which is sufficiently different from that of said first source of potential as to cause said elements to be energized.

5. A circuit for energizing any desired combination of display elements in a matrix array of thyratron-like display elements, said matrix array having rows and columns, comprising:

means for normally maintaining a sustaining potential across said display elements, said means including means for removing said sustaining potential from a row of display elements;

means for normally latching the control electrodes of said display elements at a potential which is insufficient in conjunction with said sustaining potential to energize said display elements, said latching means including means for removing the latching potential from the control electrodes of the display elements in the one or more rows having display elements it is desired to energize;

means for normally applying a potential of the same type as said latching potential to the control electrodes of said display elements;

and means, including in part said last-mentioned means, for removing last said potential from any selected column of said matrix and for instead applying to the control electrodes for the display elements of that column a potential which is sufficient in conjunction with said sustaining potential to energize the display elements of that column.

6. A circuit for energizing any desired combination of display elements in a matrix array of thyratron-like display elements having at least one control electrode, said matrix array having rows and columns, comprising:

means, including a first switching means for each row of the matrix, for normally maintaining a sustaining potential across each of said display elements;

means, including a second switching means for each row of said matrix, for normally latching the control electrode of each of said display elements at a potential which is insufficient, in conjunction with said sustaining potential to energize said display elements;

and means, including a transfer contact for each column of said matrix, for normally applying a potential of the same type as said latching potential to the control electrode of each of said display elements;

said transfer contact being transferrable to apply to the control electrode of each element in the column which it is associated with a potential which is sufficient to, in conjunction with said sustaining potential, energize the display elements of that column.

7. A circuit for energizing any desired combination of display elements in a matrix array of thyratron-like display elements having external and control electrodes, said matrix array having rows and columns, comprising:

a first switch for each row in the matrix;

means for connecting an external electrode of each display element in a given row through the associated first switch to a first source of sustaining potential;

a second switch for each row in the matrix;

a unidirectional device for each display element;

means for connecting the control electrode of each display element through its associated unidirectional device and the second switch for the row which it is in to a second source of potential, the potential of which is insufficient, in conjunction with said sustaining potential, to energize a display element;

a switch for each column of the matrix;

means for normally connecting the control electrode for the display elements in a given column through the switch for that column to a source of potential which is substantially the same as said second source of potential;

and means, including in part said last-mentioned means, operable when one of said column switches is transferred for connecting the control electrodes for the display elements in that column to a source of potential, the potential of which is sufficiently different from that of said first source of potential as to enable said display elements to be energized.

8. A circuit for illuminating any desired combination of display elements in a matrix array of display elements each of which has in series therewith a thyratron-like control element having external and control electrodes, said matrix array having rows and columns, comprising:

a first switch for each row in the matrix;

means for connecting an external electrode of each control element in a given row through the associated display element and the associated first switch to a first source of sustaining potential;

a second switch for each row in the matrix;

a unidirectional device for each control element;

means for connecting the control electrode of each control element through its associated unidirectional device and the second switch for the row which it is in to a second source of potential, the potential of which is insufficient, in conjunction with said sustaining potential, to energize a control element;

a switch for each column of the matrix;

means for normally connecting the control electrode for the control elements in a given column through the switch for that column to a source of potential which is substantially the same as said second source of potential;

and means, including said last-mentioned means, operable when one of said column switches is transferred for connecting the control electrodes for the control elements in that column to a source of potential, the potential of which is sufficiently different from that of said first source of potential as to enable said elements to be energized.

9. A circuit for energizing any desired combination of three-element neon tubes in a matrix array of said tubes said matrix array having rows and columns, comprising:

a first switch for each row in the matrix;

means for connecting an external element of each neon tube in a given row through the associated first switch to a first source of sustaining potential;

a second switch for each row in the matrix;

a unidirectional device for each tube;

means for connecting the control element of each tube through its associated unidirectional device and the second switch for the row which it is in to a second source of potential, the potential of which is insufficient, in conjunction with said sustaining potential, to energize a tube;

a switch for each column of the matrix;

means for normally connecting the control element for the tubes in a given column through the switch for that column to a source of potential which is substantially the same as said second source of potential;

and means, including in part said last-mentioned means, operable when one of said column switches is transferred for connecting the control element for the tubes in that column to a source of potential, the potential of which is sufficiently different from that of said first source of potential as to enable said tubes to be energized.

10. A circuit for illuminating any desired combination of lamps in a matrix array of lamps, each of which has in series therewith, a thyratron transistor having external and control electrodes, said matrix array having rows and columns, comprising:

a first switch for each row in the matrix;

means for connecting an external electrode of each thyratron transistor in a given row through the associated lamp and the associated first switch to a first source of sustaining potential;

a second switch for each row in the matrix;

a unidirectional device for each thyratron transistor;

means for connecting the control electrode of each thyratron transistor through its associated unidirectional device and the second switch for the row which it is in to a second source of potential, the potential of which is insufficient in conjunction with said sustaining potential, to energize a thyratron transistor;

a switch for each column of the matrix;

means for normally connecting the control electrode for the thyratron transistors in a given column through the switch for that column to a source of potential which is substantially the same as said second source of potential;

and means, including said last-mentioned means, operable when one of said column switches is transferred for connecting the control electrodes for the thyratron transistors in that column to a source of potential, the potential of which is sufficiently different from that of said first source of potential as to enable said elements to be energized.

11. A circuit for illuminating selected display elements in one or more of a plurality of matrix arrays of thyratron-like display elements, each having at least one external and control electrode comprising:

means for normally maintaining a sustaining potential across said elements, said means including individual means for removing said sustaining potential from the elements of each of said matrix arrays;

means for normally latching the control electrodes of said elements at a potential which is insufficient, in conjunction with said sustaining potential, to energize said elements, said latching means including means for removing the latching potential from the control electrodes of all the elements in the one or more matrix arrays having elements it is desired to illuminate;

means for normally applying a potential of the same type as said latching potential to the control electrodes of said elements;

and means, including in part said last-mentioned means, for removing last said potential from all elements having the same relative position in each of said matrix arrays and for instead applying to the control electrodes of said elements a potential which is sufficient, in conjunction with said sustaining potential, to energize the elements.

12. A circuit for energizing selected display elements in one or more of a plurality of matrix arrays of thyratron-like display elements each having at least one external and control electrode comprising:

a first switch for each of said matrix arrays;

means for connecting an external electrode of each element in a given array through the associated first switch to a first source of sustaining potential;

a second switch for each of said matrix arrays;

a unidirectional device for each element;

means for connecting the control electrode of each element through its associated unidirectional device and the second switch for the array which it is in to a second source of potential, the potential of which is insufficient, in conjunction with said sustaining potential, to energize a display element;

a switch for each element position of a matrix array;

means for normally connecting the control electrode for the elements having the same relative position in each of said matrix arrays through the switch for that position to a source of potential which is substantially the same as said second source of potential;

and means, including in part said last-mentioned means, operable when one of said position switches is transferred for connecting the control electrodes for the elements in that position in each of the matrix arrays to a source of potential, the potential of which is suffiicently different from that of said first source of potential as to enable said elements to be energized.

13. A circuit for illuminating selected display elements in one or more of a plurality of matrix arrays of display elements each of which has in series therewith a thyratron-like control element having at least one external and control electrode comprising:

a first switch for each of said matrix arrays;

means for connecting an external electrode of each control element for a given array through the associated display element and the associated first switch to a first source of sustaining potential;

a second switch for each of said matrix arrays;

a unidirectional device for each control element;

means for connecting the control electrode of each control element through its associated unidirectional device and the sceond switch for the array which it is in to a second source of potential, the potential of which is insufficient, in conjunction with said sustaining potential, to energize a control element;

a switch for each element position of a matrix array;

means for normally connecting the control electrode for the control elements corresponding to display elements having the same relative position in each of said matrix arrays through the switch for that position to a source of potential which is substantially the same as said second source of potential;

and means, including in part, said last-mentioned means, operable when one of said position switches is transferred for connecting the control electrodes for the control elements for the display elements at that position to a source of potential, the potential of which is sufficiently different from that of said first source of potential as to enable said control elements to be energized.

References Cited

UNITED STATES PATENTS

| | | | |
|---|---|---|---|
| 3,048,821 | 8/1962 | Burstow et al. ------ | 340—166 |
| 2,889,537 | 6/1959 | Elliott ------------- | 340—166 |
| 3,079,588 | 2/1963 | Burstow et al. ------- | 340—166 |
| 3,251,036 | 5/1966 | Smith -------------- | 340—166 |

JOHN W. CALDWELL, *Primary Examiner.*

DONALD YUSKO, *Assistant Examiner.*